US012046387B2

(12) United States Patent
Hughes

(10) Patent No.: US 12,046,387 B2
(45) Date of Patent: Jul. 23, 2024

(54) VACUUM CELL WITH INTEGRATED GUIDE STACK WALL

(71) Applicant: ColdQuanta, Inc., Boulder, CO (US)

(72) Inventor: Steven Michael Hughes, Louisville, CO (US)

(73) Assignee: ColdQuanta, Inc., Boulder, CO (US)

(*) Notice: Subject to any disclaimer, the term of this patent is extended or adjusted under 35 U.S.C. 154(b) by 349 days.

(21) Appl. No.: 17/406,125

(22) Filed: Aug. 19, 2021

(65) Prior Publication Data

US 2022/0084709 A1 Mar. 17, 2022

Related U.S. Application Data

(60) Provisional application No. 63/079,037, filed on Sep. 16, 2020.

(51) Int. Cl.
*G21K 1/00* (2006.01)
*G02B 6/26* (2006.01)
*H01P 3/00* (2006.01)

(52) U.S. Cl.
CPC ............. *G21K 1/00* (2013.01); *G02B 6/26* (2013.01); *H01P 3/00* (2013.01)

(58) Field of Classification Search
CPC .......... G21K 1/00; G02B 6/26; G02B 6/4248; H01P 3/00; G06N 10/40
See application file for complete search history.

(56) References Cited

U.S. PATENT DOCUMENTS 5,172,554 A 12/1992 Swift
6,303,928 B1 10/2001 Buell
(Continued)

FOREIGN PATENT DOCUMENTS

WO 2019241544 12/2019

OTHER PUBLICATIONS

Salim, E.A., DeNatale, J., Farkas, D.M et al. Compact, microchip-based systems for practical applications of ultracold atoms. Quantum Inf Process 10, 975 (2011). https://doi.org/10.1007/s11128-011-0300-8 (Year: 2011).*
(Continued)

*Primary Examiner* — David E Smith
*Assistant Examiner* — Christopher J Gassen
(74) *Attorney, Agent, or Firm* — Van Pelt, Yi & James LLP; Clifton Leon Anderson

(57) ABSTRACT

An ultra-high-vacuum (UHV) cell includes an integrated guide stack (IGS) as part of a boundary between an internal vacuum and an external ambient. The IGS is formed by bonding together plural integrated guide components (IGCs). Each IGC includes (prior to the bonding) electrical and/or electro-magnetic (EM) guides defined within a bulk material such as glass or silicon. The electrical guides can be, for example, conductive paths or vias, while the EM guides can include microwave or other RF guides, optical fibers and/or paths along which an index of refraction has been modified along an desired optical path. EM and electrical connections between IGCs can be formed after the IGCs are bonded together to form the IGS. Use of an IGS as a vacuum boundary can provide substantial functionality for manipulating and interrogating quantum particles; the functionality can include, for example, the ability to regulate fields within the UHV cell.

20 Claims, 6 Drawing Sheets

(56) References Cited

U.S. PATENT DOCUMENTS

| | | | |
|---|---|---|---|
| 6,476,383 B1 | 11/2002 | Esslinger | |
| 6,548,809 B2 | 4/2003 | Bouyer | |
| 6,787,759 B1 | 9/2004 | Saffman | |
| 7,126,112 B2* | 10/2006 | Anderson | G21K 1/006 |
| | | | 250/251 |
| 9,510,437 B1* | 11/2016 | Squires | H05H 3/02 |
| 9,960,025 B1 | 5/2018 | Hughes | |
| 2004/0262210 A1 | 12/2004 | Westervelt | |
| 2005/0199871 A1 | 9/2005 | Anderson | |
| 2007/0158541 A1 | 7/2007 | Katori | |
| 2009/0212204 A1* | 8/2009 | McBride | H05H 3/02 |
| | | | 250/251 |
| 2010/0200739 A1* | 8/2010 | Anderson | G21K 1/006 |
| | | | 250/251 |
| 2014/0014826 A1* | 1/2014 | Compton | G04F 5/14 |
| | | | 250/251 |
| 2017/0146958 A1* | 5/2017 | Gallinet | H03L 7/26 |
| 2020/0161016 A1* | 5/2020 | Anderson | G21K 1/093 |
| 2020/0386581 A1* | 12/2020 | Hoyt | G01R 33/26 |

OTHER PUBLICATIONS

Ho-Chiao Chuang et al 2013 J. Micromech. Microeng. 23 085004; DOI 10.1088/0960-1317/23/8/085004 (Year: 2013).*

Bartenstein et al., Atoms and Wires: Toward Atom Chips, IEEE Journal of Quantum Electronics, vol. 36, No. 12, Dec. 2000, pp. 1364-1377.

Schneider et al., Bose-Einstein condensation in a simple Microtrap, Journal of Optics, Institute of Physics Publishing, Bristol, GB, vol. 5, No. 2, Apr. 1, 2003.

* cited by examiner

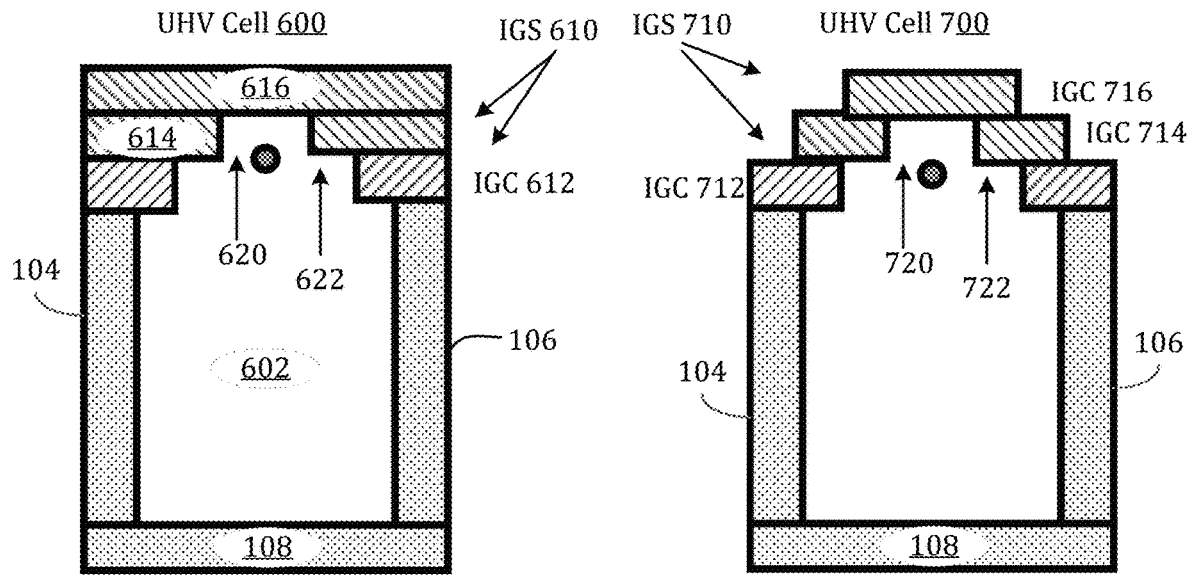
FIG. 6
FIG. 7
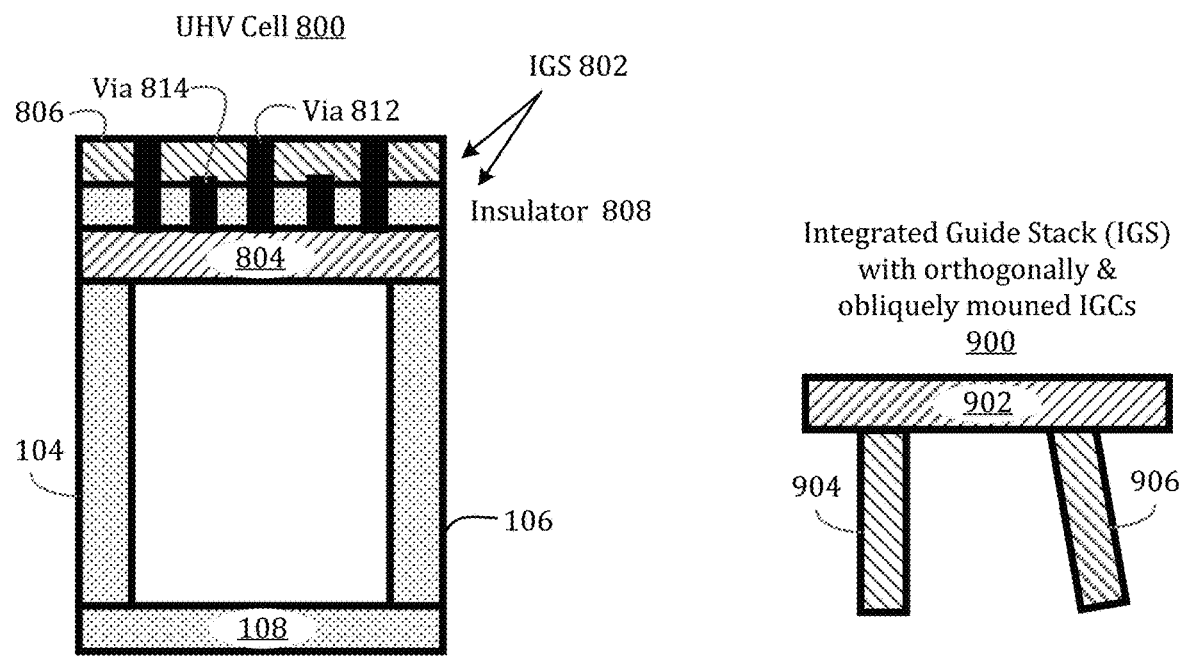
FIG. 8
FIG. 9

VACUUM CELL WITH INTEGRATED GUIDE STACK WALL

BACKGROUND

Ultra-cold-matter physics involves the study and exploitation of matter particles, e.g., atoms, at ultra-high vacuums and near absolute zero temperatures. For example, vapor phase rubidium 87 atoms can be confined in an ultra-high vacuum (UHV) cell and then cooled, controlled, and interrogated using optical (e.g., laser) radiation, as well as electrical and magnetic fields. Transparent cell walls can provide optical access to the vacuum interior of the UHV cell. Electrical feedthroughs that extend through the walls can be used to introduce currents into the cell to produce electrical and magnetic fields as required.

One approach to providing electrical access to the vacuum interior is to use an atom chip as a wall of the UHV cell. Herein, an "atom chip" is a structure in which conductive guides have been formed on a substrate and that is designed to control and/or interrogate atoms or comparable matter particles. The guides can include vias for conducting electricity, heat, and/or light between a vacuum facing surface of the atom chip to an ambient-facing surface of the atom chip. For example, an electrical current can progress from the ambient-facing surface, along a metal via, to the vacuum-facing surface, along a conductive trace on the vacuum-facing surface, to another metal via, through the atom chip, and out through the ambient-facing surface. The current can then be the source of or contribute to a magnetic field within the vacuum.

BRIEF DESCRIPTION OF THE DRAWINGS

FIGS. 6 and 7 show two variations of a UHV cell with an IGS wall into which the vacuum exterior extends.

FIG. 8 is a schematic diagram of a UHV cell with an IGS wall; the IGS includes two IGCs bonded together through an intermediate insulating layer.

FIG. 9 shows an IGS in which a substrate is bonded to an orthogonally extending IGC and an obliquely extending IGC.

DETAILED DESCRIPTION

The present invention provides an ultra-high vacuum (UHV) cell with an integrated-guide stack (IGS) serving as a boundary wall between a UHV interior and an external ambient. The IGS is assembled by directly or indirectly bonding integrated guide components (IGCs) together. Each IGC includes a bulk material and electrical and/or electromagnetic (EM) paths defined in, on, and/or through the bulk material. Guides can be connected across IGCs to provide complete electrical or EM paths between the UHV interior and the external ambient. As explained further below, the IGS wall provides for greater functionality than has been heretofore available in UHV cells with simple atom-chip walls.

Figure 1:
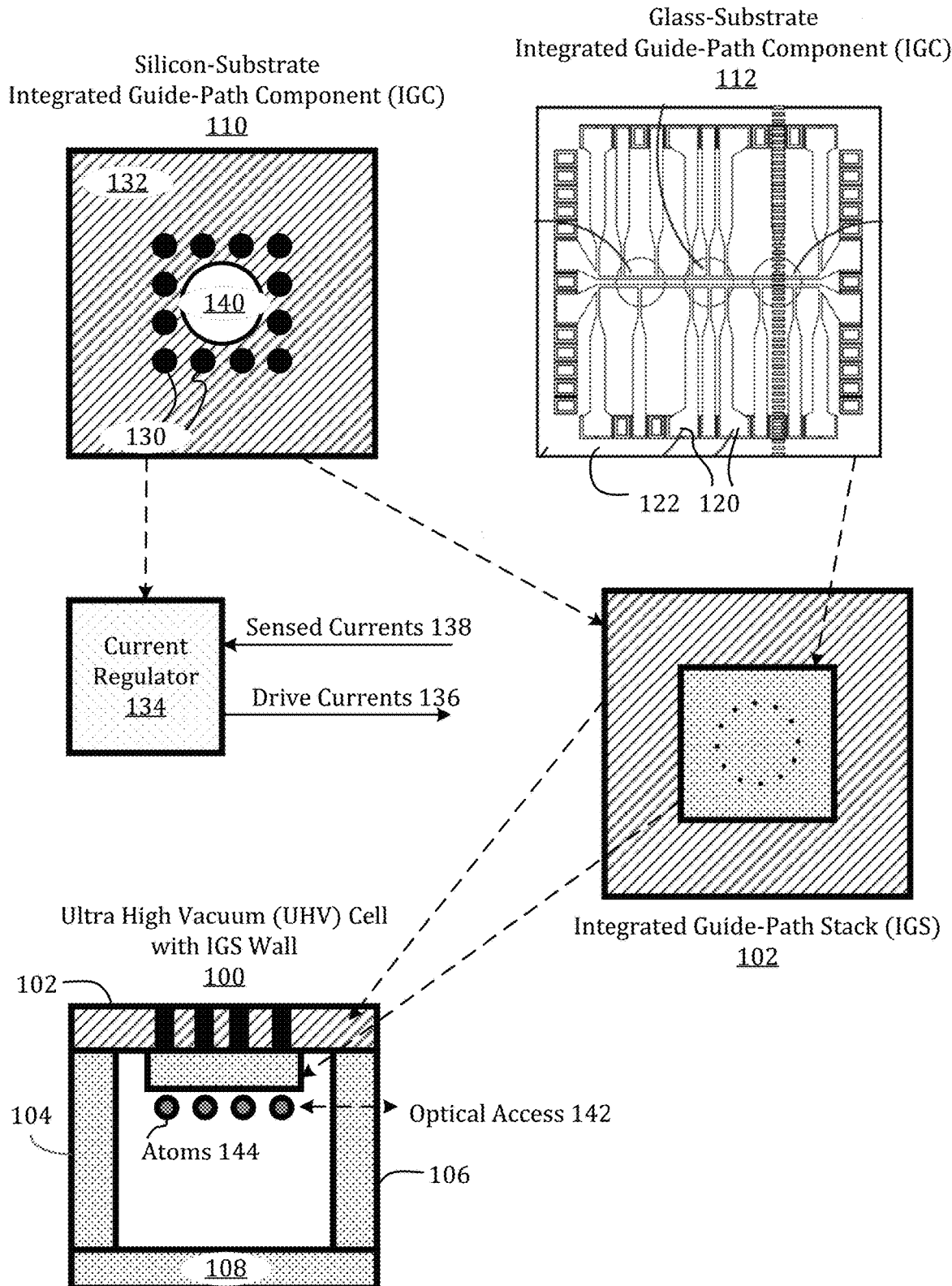
FIG. 1 is a schematic diagram of an assembly of an ultra-high vacuum (UHV) cell including an integrated-guide-stack (IGS) wall and two integrated guide components (IGCs) used to form the IGS.

For example, a UHV cell 100, shown in FIG. 1, includes an IGS 102 serving as a top wall, sidewalls 104 and 106, and a bottom wall 108. IGS 102 includes a silicon-substrate IGC 110 to which a glass-substrate IGC 112 is bonded. IGC 110 is bonded to sidewalls 104 and 106 so as to complete UHV cell 100. Glass-substrate IGC 112 has current guides 120 defined on and through its glass substrate 122. The current guides can conduct currents for use in generating and sensing magnetic fields within the vacuum interior of UHV cell 100.

IGC 110 has vias 130, serving as electrical paths, extending through silicon substrate 132. Vias 130 connect the current paths in IGC 112 to a remote controller so that a user can control magnetic fields and other aspects of vacuum cell 100. In addition, IGC 110 has a current regulator 134 defined in and on its silicon substrate 132. Current regulator 134 regulates magnetic fields within cell 100 by adjusting drive currents 136 sent to IGS 112 as a function of sensed currents 138 received from IGS 112. By providing for local (within IGS 102) regulation of currents, deviations from designed magnetic fields can be compensated much faster than if the regulation involved the remote controller.

Silicon substrate IGC 110 includes an aperture 140 extending therethrough to provide optical access to the interior of cell 100 through glass substrate IGC 112. In addition, IGS 102 provides for improved optical access 142 (e.g., to atoms 144) through sidewalls 104 and 106. In the case that the magnetic-field generating currents are on an atom chip that is bonded to the sidewalls, boundary effects associated with the region around the sidewall-atom-chip bond can impair optical access to atoms near the current path surface. However, since glass-substrate 122 of IGC 112 protrudes below the IGS-sidewall bonds, any impairment due to boundary conditions is substantially reduced. To sum up for cell 100, the IGS wall provides greater functionality (local regulation of currents and magnetic fields) and improved optical access to atoms in cell 100 through sidewalls 104 and 106.

Figure 2:
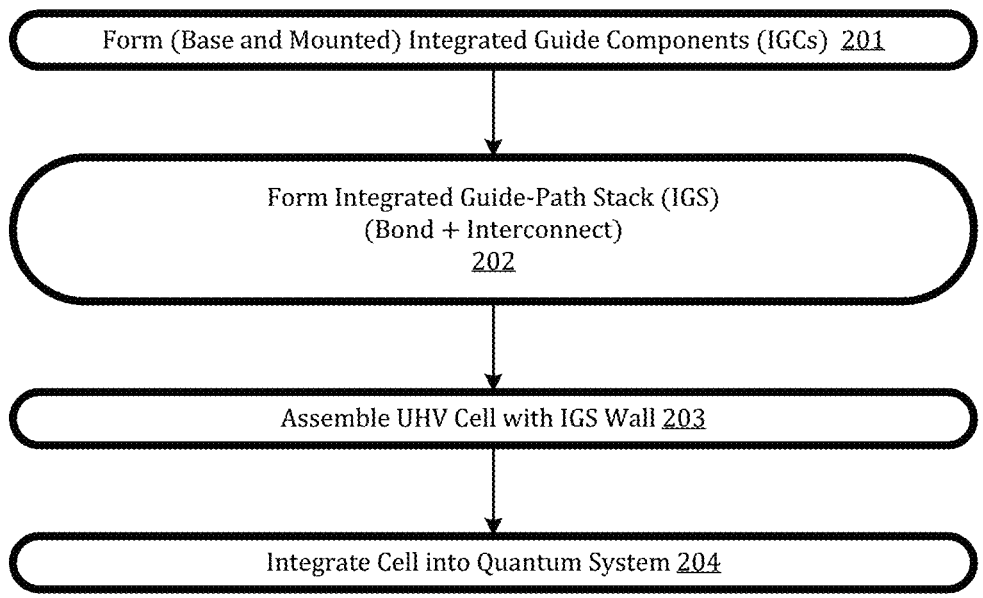
FIG. 2 is a flow chart of an IGS-wall vacuum cell formation process that can be used to make the UHV cell of FIG. 1 and other UHV cells.

An integrated guide stack (IGS) wall vacuum cell formation process 200 is flow charted in FIG. 2. At 201, integrated guide components (IGCs) are formed. Each IGC can include a substrate in, on, or through which EM electrical guides, e.g., microwave or optical waveguides or electrical conductors, are formed. The bulk material of an IGC can be of silicon, glass, or other material. Electrical conductors can, for example, be formed photolithographically and EM waveguides can be formed by modifying the index of refraction along the intended path. Alternatively, a electrical/EM guides can be formed using other approaches discussed further below.

At 202, an IGS is formed by bonding two or more IGCs directly or indirectly (e.g., via an adhesive or transition structure) together. One of the advantages of the invention is that it permits substrates of different bulk materials to be bonded together to take advantage of the functionalities achievable with each bulk material; for example, silicon can be anodically bonded with glass. However, the invention also provides for IGSs in which the IGCs have the same or similar (e.g., different types of glass) bulk material. Interconnects can be formed, e.g., by placing guides in different IGCs to contact each other, or by adding connects (e.g., wires, optical fibers or microwave or radio-frequency (RF) guides) between guides in different IGCs, or by forming guides that extend through or into two or more IGCs.

At 203, a UHV cell is assembled that includes the completed IGS as a vacuum-boundary wall at least in part by bonding the IGS stack to other vacuum-boundary walls. In some cases, this can be the final step in the formation of a UHV cell. In other cases, further steps are required, e.g., introducing a source of atoms into the cell interior and then evacuating the cell interior to establish a UHV, then sealing a port used to evacuate the cell interior.

At 204, the UHV cell can be integrated in a quantum system. External electronic equipment can be connected to interior elements via electrically conductive guides. Lasers, imagers and other photodetectors can have optical access to the cell interior through cell walls and/or optical waveguides. Likewise microwave and other RF signals can have access using EM waveguides.

Figure 3:
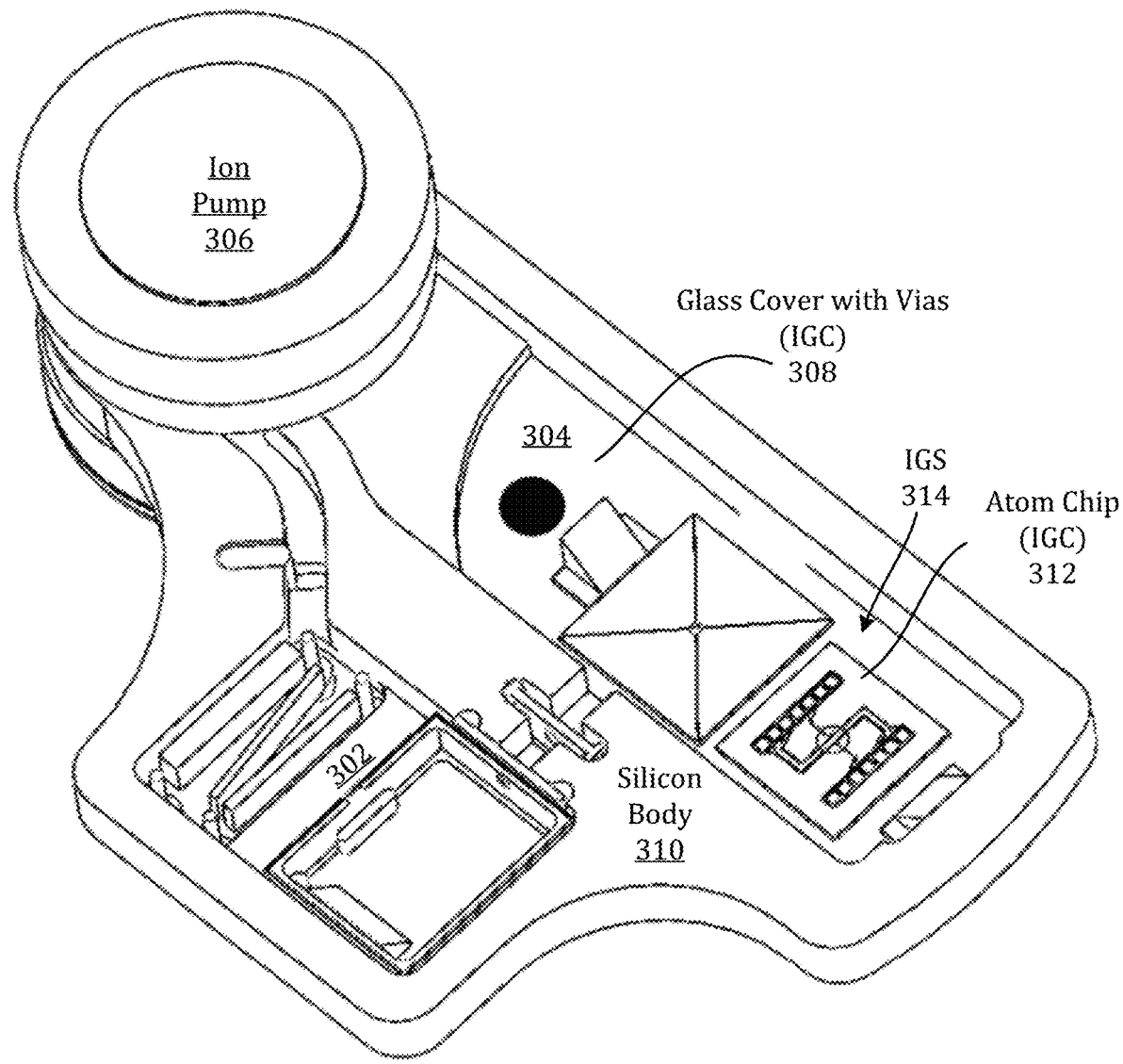
FIG. 3 is a perspective view of a multi-chamber UHV cell with an IGS bottom cover; a top cover for the UHV cell is omitted so that the interior of the cell can be viewed.

A micro-channel UHV cell 300 is shown in FIG. 3 with a glass top cover removed to expose cell internals. Material has been removed from a block of monocrystalline silicon to define a source chamber 302, an atom manipulation chamber 304, and an ion-pump chamber (into which an ion pump 306 has been inserted) within a silicon body 310. When cell 300 is fully assembled, source chamber 302 and atom-manipulation chamber 304 are sealed below by a glass bottom cover 308 and the afore-mentioned top cover. An atom chip 312 is mounted on glass bottom cover 308, which has metal vias electrically connecting atom chip 312 to a remote controller. Thus, atom chip 312 and the bottom cover 308 are IGCs of an IGS 314.

The covers may be bonded to the body in either order. In the event the top cover is bonded first and followed by the bottom cover, then the bonding of the IGS to the silicon body completes cell assembly; otherwise the assembly is completed in part by bonding of the IGS followed by the bonding of the top cover. Note that, in microchannel UHV cell 300, a glass IGC (namely, the glass bottom cover) is bonded to what is, in effect, a silicon sidewall, while in vacuum cell 100, a silicon IGC is bonded to glass sidewalls. In other embodiments, a glass IGC is bonded to glass sidewalls or a silicon IGC is bonded to silicon sidewalls. Other embodiments use other (not silicon and not glass) materials for IGC bulk materials and non-IGC cell sidewalls.

Figure 4:
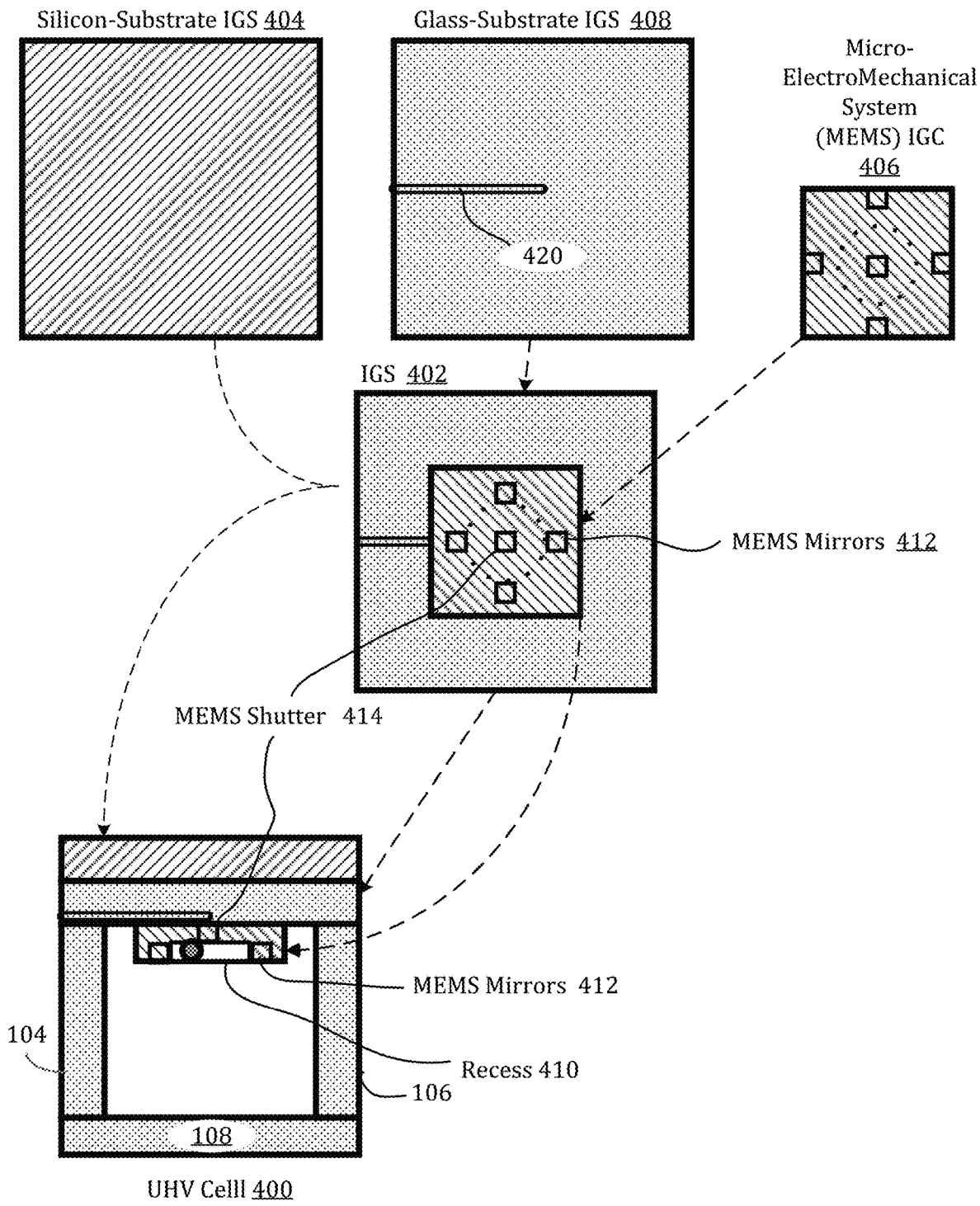
FIG. 4 is a schematic diagram of an assembly of an ultra-high vacuum (UHV) cell including an IGS wall and three IGCs used to form the IGS.

A UHV cell 400, shown in FIG. 4, includes a three-IGC IGS 402. Silicon substrate IGCs 404 and 406 are bonded to respective sides of a glass substrate IGC 408. Silicon substrate IGC 406, which protrudes into the interior of UHV cell 400, includes a recess 410 bounded by four micro electro-mechanical (MEMS) mirrors 412 that can be used to steer light beams within recess 410. In addition, IGC 406 includes a micro-mechanical shutter 414 to selectively block or let pass light arriving from glass substrate IGC 408. In view of the micro-mechanical mirrors 412 and shutter 414 IGC 406 can be characterized as a MEMS IGC.

MEMS IGC 406 is bonded to glass substrate IGC 408, which is bonded to UHV sidewalls 104 and 106. IGC 408 has an EM waveguide 420 defined therein allowing it to guide laser light or microwaves generated external to cell 400 to the location of shutter 414. Thus, shutter 414 can control whether or not EM waveforms in waveguide 420 are admitted into recess 410 of MEMS IGC 406. IGC 408 also includes vias that are electrically connected to the shutter and mirrors so that they can be electrically controlled.

Silicon substrate IGC 406 includes vias that connect to the vias of glass IGC 408 so that a remote controller can control mirrors 412 and shutter 414 using the electrical guides including the vias through IGC 404 and IGC 408. In addition, IGC 404 includes regulator circuitry to compensate for errors in mirror positioning around recess 410.

Figure 5:
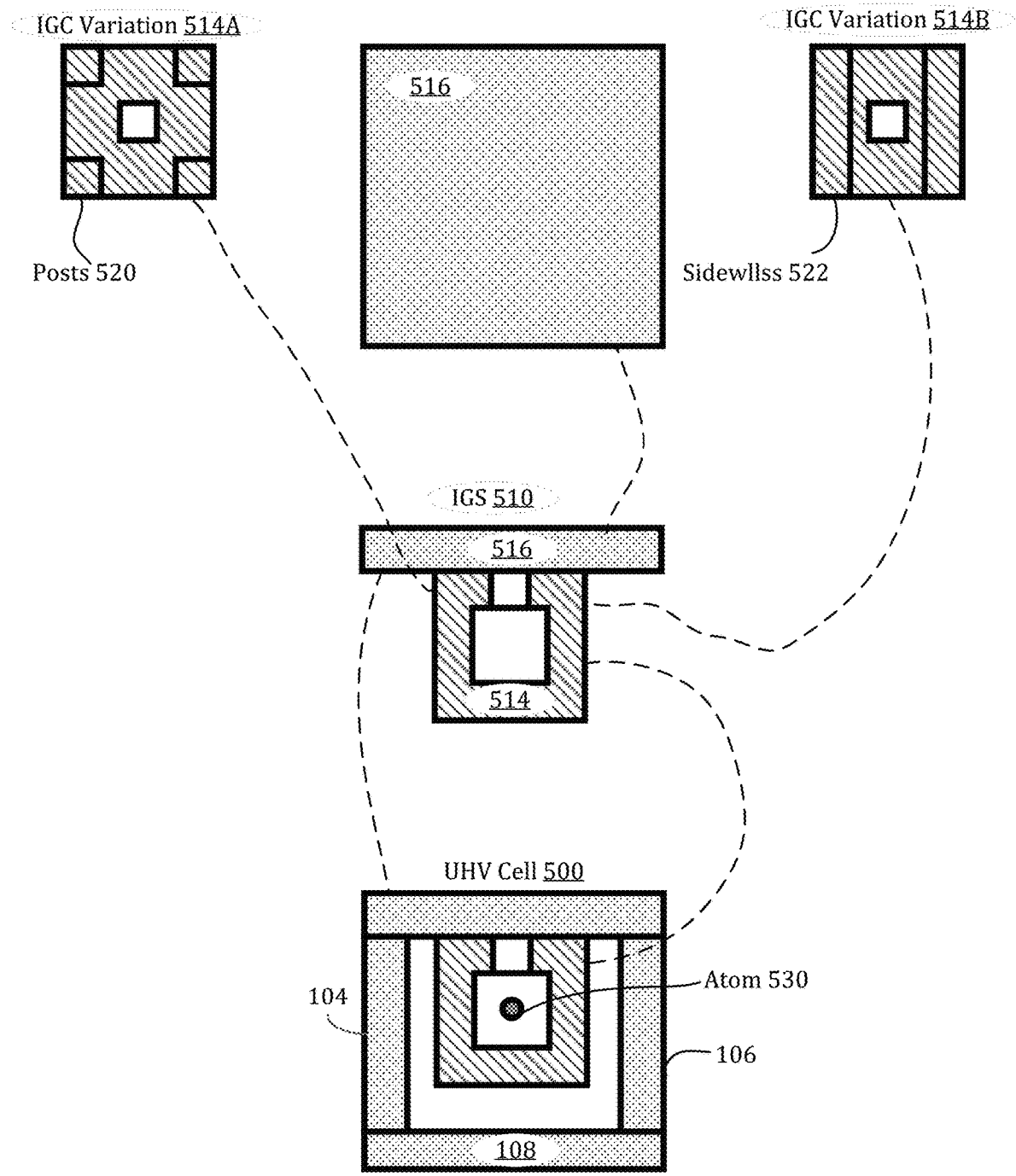
FIG. 5 a schematic diagram of an assembly of an ultra-high vacuum (UHV) cell including an IGS wall, its IPCs, one of which is an integrated-path manifold, two variations of which are shown.

While the IGCs described above are all essentially chip-like, that is, thin and planar, other embodiments implement IGCs with more complex shapes. For example, UHV cell 500, shown in FIG. 5, employs an IGS 510 with a manifold IGC 514 that can surround through-going atoms 530 for greater control and more complete interrogation (sensing). Manifold IGC 514 is bonded to a planar glass IGC 516, which is bonded to sidewalls 104 and 106 of UHV cell 500. There are variations of UHV cell 500. For example, in one variation 514A the top and bottom of the manifold IGC are separated by four posts 520, while in another variation 514B, the top and bottom of the manifold IGC are separated by two sidewalls 522.

A UHV cell 600, shown in FIG. 6, has its vacuum interior 602 extend above the sidewalls and into an opening in an IGS 610. This arrangement allows field plates and current paths to affect atoms in the opening from above and on all sides. IGS includes IGCs 612, 614, and 616. All three IGCs extend over the same size areas, but IGC 616 has no aperture, IGC 614 has a relatively small aperture 620, and IGC 612 has a larger aperture 622.

A UHV cell 700, shown in FIG. 7, similarly allows the vacuum interior of the cell to extend above sidewalls 104 and 106 and into an IGS 710. IGS 710 includes IGCs 712, 714, and 716. IGC 716 has the smallest area and no aperture, IGC 712 has the largest area and a relatively large aperture 722, and a IGC 714 has an intermediate area and a relatively small aperture 720.

A UHV cell 800, shown in FIG. 8, has an IGS 802 with two silicon substrate IGCs 804 and 806 bonded to opposite sides of an insulating layer 806 (which can be an adhesive layer for bonding IGCs 804 and 806 to each other). In other words, In IGS 802, IGC 804 is bonded to IGC 806 indirectly through insulating layer 808. IGC 806 is designed to regulate fields generated in the vacuum interior of cell 800 by IGC 804. After IGS 802 is assembled, vias 812 are formed through IGC 806 and insulating layer 808 to electrically connect IGC 804 to an external controller, and vias 814 are formed through insulating layer 808 (but not through IGC 806) to connect IGC 804 to regulating circuits in IGC 806. An advantage of the intermediate insulating layer is that both the vacuum-facing side of IGC 806 and the ambient-facing side of IGC 804 can have metallization patterns that do not interfere with (e.g., short circuit) each other. Insulator 808 is not considered an IGC since vias 812 and 814 were formed after stack assembly and so were not part of the insulator before IGS 802 was formed.

While in the foregoing embodiments, planar IGCs are arranged parallel to each other, the invention provides for other arrangements. For example, an IGS 900, shown in FIG. 9, has a base IGC 902, a second IGC 904 arranged orthogonal to the base IGC, and a third IGC 906 arranged obliquely (not parallel and not orthogonal) to the base IGC. Oblique IGCs can have polished surfaces and, so, function as reflectors (in addition to other functions).

All the UHV cells described above are designed to leverage quantum phenomenon. As such, they can contain quantum particles, that is, quantum-state carriers (QSCs) having multiple quantum states that can be used to represent superposition values. For example, the QSCs can be rubidium 87 or cesium 133 atoms in a vapor phase or a Bose-Einstein condensate (BEC). Alternatively, other isotopes of rubidium and cesium, other alkali or alkaline earth metal atoms, and other molecular entities can be used. Herein, the term "molecular entity" is used as defined in the International Union of Pure and Applied Chemistry (IUPAC) Gold Book to mean: "Any constitutionally or isotopically distinct atom, molecule, ion, ion pair, radical, radical ion, complex, conformer etc., identifiable as a separately distinguishable entity."

In an example, a UHV cell has a plurality of atom chips or a monolithic atom-chip-like-structure with at least one of the atom chips forming a vacuum cell wall. The atom chips are composed of at least two fundamentally different materials. The materials can be transitioned smoothly in a monolithic fashion to form a single planar object or an object with at least one planar surface. Variations include stamping or forming of lenses or other structures natively into the bulk on at least one plane as long as a bonding plane is still available for hermetic sealing.

A second chip can be bonded and suspended to the first chip on support conductive/insulated structures/rods to enable a single plate to pride a second and even additional planes with electric/magnetic/etc. field control while serving as a single vacuum wall. For instance, a smaller chip can be suspended parallel and offset a larger vacuum wall chip minimizing assembly complexity and enabling all field plates to be addressed from the feedthroughs of the single vacuum wall chip. Such a method can also be used to define multiple cathodes or anodes in a distributed ion pump integrated to the vacuum wall chip. The additional chips can further have some or all of the features below such as on-chip gratings/optics, coils, field plates, hot mirrors, MEMS actuators, etc. The bulk material can also be a single fundamental material with local doping, ion imbedding, surface modification, bulk modification, laser written refractive index or atomic structure modification, etc., to effectively form highly localized guides or regions with significantly different thermal, electrical, optical, or mechanical properties.

An atom chip can be formed by machining patterns into silicon via deep reactive ion etching (DRIE), sinker ultrasonic, etching, electrical discharge machining (EDM), grinding, and/or other steep wall capable methods. A Borofloat or other glass material can then be installed into the machined out areas and reflowing. An atom chip can be made with aluminosilicate rather than Borofloat to limit helium permeation. Alternatively, an atom chip can have an $Al_2O_3$, graphene, or other helium barrier coating.

Glass can be deposited via solgel or wet chemical deposition and growing, heated slumping or reflow at atmosphere, under a gas environment or in vacuum, laser fusing and deposition as in three-dimensional (3D) printing of glass, deposition of metal beads in an oxygenating environment to convert metals to glass as soon as deposited to selectively form conductive or insulative structures in three dimensions. These techniques can be used for internal vacuum parts or for hermetic seals as both insulators and conductive feed throughs and vacuum walls.

During or after forming/deposition/annealing, etc., of glass or glass precursor, dopings or impurities can be introduced to change the electrical, optical, or mechanical properties of the glass to match the desired function, e.g., match wavelength transmission, absorption, rejection to match conductivity, resistivity, insulation, match thermal expansion coefficient, match sodium content for anodic bonding or chemical compatibility for other bonding techniques.

The ID walls of the silicon can be polished to improve bonding and reduce micro voids captured during glass reflow. Polished walls can enable post-reflow of glass anodic bonding to reinforce the joint formed between the glass and silicon monolithic structures either before or after post-forming polishing of opposing planes. The polish acts to remove bulk glass and silicon and/or other materials used to remove any continuous paths, shorts, or connections between the patterned structures enabling glass to fully isolate islands of silicon, or isolate material between two islands. Interface planes in the patterning can be oblique to the major plane of the chip, and can be curved, sloped, etc., based on the method of forming/etching, etc. For instance, etching and polishing can be used to achieve crystallographically defined planes at angles other than 90° (depending on the material being formed/machined). These techniques can be used to form reflectors for beams at useful angles, or serve as focusing horns or gradient index transitions between materials for optical, microwave, near infrared (NIR) or other radiation. Such angled reflectors in the bulk can be used for optical coupling into integrated waveguides, or multiple-bounce baffles for optical isolation.

While foregoing embodiments use vias for interconnects between IGCs, some embodiments use wire bonding for 3D loops and coils, to attach and connect IGCs and features like ion traps, to tether down support poles in the fashion of a sail mast, as little antennae, or out of plane mounts. Patterning, plating, etching dielectric plating, etc., can be used to form 3D coils or 3D conductive paths for structure, electric, and/or magnetic fields. Integrated feedthrough pads of silicon in the atom chip structure can be used as electrical vias. The coils can permit wireless power transfer and LRC circuits on an atom chip. In general, an IGC can include features for inductive or RF power coupling.

Silicon and glass structures can act as vias for high-frequency electrical waveforms such as capacitor couplers, or transmissive windows depending on wavelength. Such structures can be multi-purpose, acting as windows for one type of radiation, reflectors for another, conductors, or insulators, etc., especially in conjunction with thin layers of dielectric, metals, and other materials patterned onto the surfaces.

Optics can be formed on-chip, bonded, suspended, attached to, or even formed within the bulk of the glass or silicon. Integrated formed optics can be formed by thermal molding, thermal surface tension shaping via flame, laser, or other controlled, local, or focused heating method. The forming can be external or integrated into the structure (e.g., silicon can take current run through it to electrically or thermally alter the optical properties of the monolithic fused glass-like structures). Such forming can be used to adjust fine focus of a lens, change refractive index, impart electro-optical or acousto-optical affects into the glass or silicon. Silicon can be used as an optic for longer near-infrared (NIR) wavelengths and as such may have doping to adjust its optical properties. Silicon can also be etched for gratings or other optical structures like reflectors, beamsplitters, etc. Patterned metallizations can also help on-chip optics for optical beamforming, steering, and splitting similar to grating MOTs on an atom chip and with integrated electric, magnetic and other controls.

In glass patterned or on-glass or silicon surface patterned diffraction gratings or diffraction grating in the bulk of silicon, e.g., for NIR grating, can serve as reflectors. Metal gratings can be pattered by photoetching, mechanical transfer, direct bonding/anodic bonding of pre-made parts, etc. This could make atom chips in which as just a single beam is needed for everything, atom cooling, movement, BEC cooling, etc. Focusing elements for electro-optical modulators (EOMs) and acousto-optical modulators (AOM) can be combined on an atom chip, photonic integrated circuit (PIC) or optical waveguides, diffractive elements, MEMs, etc.

Etched microstructures can be used for meta-materials, or to form anti-reflection surfaces or light absorbing surfaces such as black silicon, or moth-eye coatings on glass. Micro etching may also be used to greatly increase surface area to prepare surfaces for evaporable getters to enable on-chip getter pumps that pump right near the critical BEC or other closely suspended atoms to improve performance of fundamental quantum operations in the BEC by reducing background gas collisions.

Structured metamaterials can be grown, deposited, etched, flip-chip bonded or bonded by other means onto or into the surface of the atom chip to allow for unique optical, radio frequency (RF), microwave, or other radiation controlling and conditioning effects whether reflecting off of, transmitting through, or coupling through integrated waveguides like fibers.

Waveguides can be integrated into the atom chips one dimensionally or multi-dimensionally. The waveguides can be formed either at polished boundaries between silicon and glass, or by doping, laser writing, etching or otherwise patterning 1, 2, or 3 dimensional structures into the bulk material(s). The waveguides can be used for guiding, steering (active or passive when combined with other active thermal, electrical, piezo or other actuations defined above and integrated into or onto or used in conjunction with the atom chip). Coupling to in-plane waveguides can be achieved via evanescent coupling, direct fiber butting/bonding, direct bond to gradient-index (GRIN) lenses, which in turn are bonded or mounted to fibers or fiber ferrules. Silicon or glass ferrules can be pre-aligned to internal waveguides or windows and thus direct bonded (anodic, contact, hydroxide, frit, transient liquid phase (TLP), etc.). This approach allows fibers to be mechanically installed later with a high precision alignment of the ferrule or GRIN-lens-Ferrule structure. Prisms, lenses, or other optics may be formed into or direct bonded or index matched to the surface to affect optical coupling into integrated waveguide structures. Such waveguides can be used for evanescent interaction with BEC or other cold or ultra-cold atoms.

Optical fibers can be coupled through atom chips by local slumping, fritting, fusing, bonding a continuous fiber straight through the chip and pre aligned to internal, on-chip, or near chip optics or regions of interest requiring guided radiation. Fibers can be bonded via direct, contact, anodic, frit, hydroxide assisted, TLP and other methods to the chip to couple straight into or evanescently interact with the atom chip.

Local heating with high power lasers can be used in the presence of alkali, alkaline earth or other materials in gas form in vacuum to locally darken the glass for attenuation or to raster traces into the glass for high resistance electrical paths or to pattern volumetric diffraction gratings.

An ion trap can be bonded either directly or as a feedthrough directly to an atom chip. Mounting can be standard bonding, or methods often used for ion trap mounting, as well as wire bonding. An atom chip can also include field plates using traces and feedthroughs, indium titanium oxide (ITO, a transparent conductor) or other larger area plates possibly in conjunction with magnetic field traces or fine electric field traces. Hughes Labs alkali source can be used for efficient operation. Graphite deposited on beta aluminum electrodes on both sides. Put an electrical potential to drive rubidium back through to source. Epoxy on the backside can be used to encapsulate. This can serve as an in-source cell pressure regulator. It can be important to have high effective surface area getter on an atom chip.

An atom chip captured optic can be in a recessed pocket that the chip is bonded to, such as a waveplate. Atom chip integrated circuits (ICs) for on-chip logic, amplification, or other operations similar to neural clusters in your nervous system can provide reflex response rather than waiting for the signal to travel to and be processed by the brain (external controller). Thus, on-chip logic can be used for adaptive algorithms to tune the quantum device/computer. using on-chip field/optical/or other sensors/transducers. MEMS hybrids can include building up structure for ion traps, or topological traces to use tight 3D control of magnetic or electric fields. MEMs can be used to precisely position optics, magnetics, field plates, etc., near quantum cloud/bits. Such structures can be used in conjunction with on-board ICs to perform local reflex-like adaptive responses to changes in the cloud.

Anatom chip can have on-chip-mounted electric components, capacitors, resistors, inductors, coils, lasers such as vertical-cavity surface-emitting lasers (VCSELs), etc. Capacitors can be metalized or ITO layers with insulators in between can be patterned on surface capacitors for impedance matching in conjunction with patterned coils, single or multi-level/layer to facilitate active electronics or radio frequency (RF) feedthroughs.

Atom chips can be patterned with ITO coatings for transparent conductive traces feeding circuits/components/transducers or surfaces or for field neutralization. Atom-chip-like fusion of glass-silicon in thicker or topographical components such as glass tubing, glass cell walls, machined channel cells, etc. where silicon is pressed, heated and fused into the bulk machined from the glass or where glass is flown then polished/machined out of items such as topographically complex channel cells or silicon frames/backbones can be used to imbed traces into or on surfaces of complex geometric shapes forming part or all of a vacuum chamber. IGCs can be formed, at least in part via 3D printing through selective laser sintering/fusing or other methods compatible with the bulk glass, silicon, or other material. Atom chips can be made of de-rebondable materials (also happens to be aluminosilicate or barrier coated chips) so chips can be removed and replaced later if damaged or to just recycle parts.

Atom chips can include on-chip getters, pumps, either mounted, plated, patterned, evaporated onto, etc. This allows simplistic fire-and-forget ion pumps, sublimators, evaporators similar to how barium and other getters have been used as fire and forget pumping in the fabrication of vacuum tubes. Atom chip traces can provide electrical power to carbon based getters/prefilters/re-dispensers such as CN-PG or continuously nucleated pyrolytic graphite components allowing on-chip alkali metal collection and re-dispensing for hot, or near-hot atom physics.

Multiple atom chips, i.e., IGSs can get interesting 3D topographical field manipulations for atom manipulation or quantum computing for either full 3D space manipulation or multiple 2D plane manipulations. State prep or precooling can be done on one chip and transferred to the other, e.g., by various means including chip-guiding, laser guiding/impulse, external coil transfer, etc.).

An IGC can have solar, optical, or thermal to electrical transducer to provide power. Black silicon can be used to improve efficiency. Thus, recycled light, electrical energy, or thermal energy can be used to generate power. Atoms, e.g., $^{87}$Ru atoms can be recycled. Beta aluminum can be used on surfaces. Alkali atoms stick to beta aluminum. An electrical potential can be used to draw the atoms back toward the source. This can serve as a long lasting closed-circuit pump for small alkali sources.

The present invention applies to vacuum cells and is especially applicable to ultra-high-vacuum (UHV) cells, that is, cells that can maintain an internal pressure less than $10^{-9}$ Torr. These vacuum cells include an integrated guide stack (IGS) that serves as a vacuum boundary separating an internal vacuum from an external non-UHV ambient. The IGS is bonded to a cell wall structure including one or more other vacuum boundary walls of the UHV cell.

As used herein, "IGS" refers to an object formed by bonding two or more integrated guide components (IGCs) together. To qualify as an IGC: 1) an entity must have an electrical guide (e.g., a metal or doped silicon conductor) or optical guides (e.g., optical fibers or waveguides) defined in, on, or through a bulk material or combination of bulk materials; and 2) the guides must have been in place before the IGS was assembled.

"Electro-magnetic" or "EM" herein encompasses optical as well as microwave and other RF wavelengths. "Microwave", as broadly defined herein, encompasses electromagnetic radiation of wavelengths of one meter (corresponding to a frequency of 300 megahertz (MHz)) down to 100 micrometers (corresponding to a frequency of three terahertz (THz)); in other words, "microwave", as defined herein, encompasses ultra-high frequency (UHF), super high frequency (SHF), extremely high frequency (EHF), also known as "millimeter wave", and tremendously high frequency (THF) frequency ranges defined by the International Telecommunications Union (ITU). "Radio frequency" and "RF" encompass microwaves as well as longer wavelengths one meter to 10 kilometers and over. "Optical" herein encompasses visible, ultraviolet, and infrared wavelengths.

To qualify as a "guide", an entity must confine movement of a charged particle (e.g., electron) or an EM particle (e.g., photon) along a longitudinal direction of length greater than the greatest transverse diameter to which the particle is confined. An IGC can be planar like existing atom chips and integrated circuits. Alternatively, an IGC can assume various three-dimensional shapes, e.g., defining manifolds, pockets, and traps.

The vacuum cells disclosed herein are designed for acting upon quantum state carriers (QSCs) in the form of molecular entities such as cesium and rubidium atoms. The molecular entities can be cold (less than 1 milliKelvin), ultra-cold (less than 1 microKelvin), and even have temperatures below 100 nanoKelvin.

Herein, all art labelled "prior art", if any, is admitted prior art; art not labelled "prior art", if any, is not admitted prior art. The illustrated embodiments, modifications thereto, and variations thereupon are provided for by the present invention, the scope of which is defined by the following claims.

What is claimed is:

1. An ultra-high vacuum (UHV) cell assembly process comprising:
    forming integrated guide components (IGCs), each IGC including a bulk material, each IGC including plural optical or electrical guides on, in, or through the respective bulk material;
    assembling an integrated-guide stack (IGS) at least in part by bonding a first IGC of the IGCs directly or indirectly to a second IGC so that at least one of the guides of the first IGC contacts at least one of the guides of the second IGC to electrically or optically connect one or more guides of the first IGC with one or more of the guides of the second IGC; and
    isolating a UHV in an interior of a UHV cell from an ambient external to the UHV cell at least in part by bonding the IGS to at least one wall of the UHV cell.

2. The ultra-high vacuum (UHV) cell assembly process of claim 1, further comprising introducing a source of quantum-state carriers (QSCs) into the UHV cell.

3. The ultra-high vacuum (UHV) cell assembly process of claim 2, wherein the QSCs are molecular entities.

4. The ultra-high vacuum (UHV) cell assembly process of claim 3, wherein the molecular entities are cold neutral atoms.

5. The ultra-high vacuum (UHV) cell assembly process of claim 4, wherein the cold neutral atoms are cesium or rubidium atoms.

6. The ultra-high vacuum (UHV) cell assembly process of claim 1, wherein the bulk material of the second IGC is different from the bulk material of the first IGC.

7. The ultra-high vacuum (UHV) cell assembly process of claim 6, wherein the bulk material of the first IGC is silicon and the bulk material of the second IGC is glass.

8. The ultra-high vacuum (UHV) cell assembly process of claim 1, wherein the guides of the first and second IGCs include glass, metal, or doped silicon.

9. The ultra-high vacuum (UHV) cell assembly process of claim 1, wherein the isolating includes bonding the first IGC to the wall of the UHV cell so that the second IGC protrudes into the interior of the UHV cell.

10. The ultra-high vacuum (UHV) cell assembly process of claim 1, further comprising regulating, by the first IGC fields generated by the second IGC, the regulating being in response to sense data received by the first IGC from the second IGC.

11. An ultra-high-vacuum (UHV) cell comprising:
    a wall structure surrounding a cell interior; and
    an integrated guide stack (IGS) bonded to the wall structure to isolate a UHV in the cell interior from an ambient external to the cell, the IGS including plural integrated path components (IGCs), each IGC including a bulk material with plural guides defined in, on, or through the respective bulk material, each of the plural guides being an electrical conductor or optical waveguide, guides of a first IGC of the IGCs being electrically or optically coupled to guides of a second IGC of the IGCs, at least one of the guides of the first IGC contacting at least one of the guides of the second IGC.

12. The ultra-high-vacuum (UHV) cell of claim 11, further comprising quantum-state carriers (QSCs) within the cell interior.

13. The ultra-high-vacuum (UHV) cell of claim 12, wherein the QSCs are molecular entities.

14. The ultra-high-vacuum (UHV) cell of claim 13, wherein the molecular entities are cold neutral atoms.

15. The ultra-high-vacuum (UHV) cell of claim 14, wherein the cold neutral atoms are cesium or rubidium atoms.

16. The ultra-high-vacuum (UHV) cell of claim 11, wherein the bulk material of the second IGC is different from the bulk material of the first IGC.

17. The ultra-high-vacuum (UHV) cell of claim 16, wherein the bulk material of the first IGC is silicon and the bulk material of the second IGC is glass.

18. The ultra-high-vacuum (UHV) cell of claim 11, wherein the guides of the first and second IGCs include glass, metal, or doped silicon.

19. The ultra-high-vacuum (UHV) cell of claim 11, wherein the second IGC protrudes into the cell interior.

20. The ultra-high-vacuum (UHV) cell of claim 11, wherein the second IGC regulates fields generated by the first IGC in response to sense data received by the second IGC from the first IGC.

\* \* \* \* \*